United States Patent
Williams (10) Patent No.: US 10,754,802 B2
(45) Date of Patent: Aug. 25, 2020

(54) DYNAMICALLY REMAPPING IN-PROCESS DATA TRANSFERS

(71) Applicant: Intel Corporation, Santa Clara, CA (US)

(72) Inventor: Dan J. Williams, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/243,936

(22) Filed: Jan. 9, 2019

(65) Prior Publication Data

US 2019/0146936 A1    May 16, 2019

(51) Int. Cl.
    *G06F 11/16* (2006.01)
    *G06F 13/28* (2006.01)
    *G06F 13/42* (2006.01)
    *G06F 3/06* (2006.01)

(52) U.S. Cl.
    CPC ........... *G06F 13/28* (2013.01); *G06F 3/0604* (2013.01); *G06F 3/0644* (2013.01); *G06F 3/0647* (2013.01); *G06F 3/0673* (2013.01); *G06F 13/4282* (2013.01); *G06F 2213/0026* (2013.01)

(58) Field of Classification Search
    None
    See application file for complete search history.

(56) References Cited

U.S. PATENT DOCUMENTS

| | | | |
|---|---|---|---|
| 2015/0020070 A1* | 1/2015 | Phelan | G06F 9/5016 718/1 |
| 2015/0169418 A1* | 6/2015 | Cardona | G06F 11/2033 714/4.11 |
| 2018/0077235 A1* | 3/2018 | Nachimuthu | G06F 12/00 |
| 2020/0090715 A1* | 3/2020 | Dodge | G11C 5/025 |

OTHER PUBLICATIONS

Johnson Tony, "What is Persistent Memory", Apr. 6, 2017, Innovative Integration, Inc. (Year: 2017).*
Chris Mellor, "Persistent memory: Has HPE got there already?", Mar. 8, 2016 (Year: 2016).*

* cited by examiner

*Primary Examiner* — Hyun Nam
(74) *Attorney, Agent, or Firm* — Compass IP Law, PC (57) ABSTRACT

Embodiments include a method to determine whether to dynamically remap an in-process update of a first page of memory to a second page of memory. When a dynamic remap is determined, the method causes a pause of the in-process update to the first page of memory by one or more bridges, draining of in-process direct memory access (DMA) operations, and redirecting the update to the second page of memory.

13 Claims, 4 Drawing Sheets

DYNAMICALLY REMAPPING IN-PROCESS DATA TRANSFERS

BACKGROUND

Persistent memory (PM) enabled operating systems (OSs) include a direct access (DAX) mechanism to expose PM media to applications with direct memory mappings. "Direct" in this context means no indirection through an OS buffer cache, and load/store instruction data access from the processor (that is, no intermediary host adapter). This minimizes sources of overhead in the data persistence path, but also compromises the ability of the OS to perform address space management operations.

In particular, an OS filesystem that has made a DAX mapping available to device direct memory access (DMA) may determine the need to remap that access while the access operation is in process. Consider a filesystem that is directed to snapshot the current state of a file. With indirection the filesystem can buffer ongoing DMA in memory and write the data later, but without that indirection the only option is to wait for a quiescent state for device DMA before the device DMA can be redirected to a new physical address (e.g., a new DAX page).

For DAX, if the only solution for redirection is to wait for active device DMA to quiesce this can lead to unbounded and indefinite waits. While most DMA transactions are transient, remote direct memory access (RDMA) and other protocols may keep a DMA operation active indefinitely at the control of the RDMA application, but not the OS (that is, not the filesystem that is the owner of the address space layout for a file). As DAX applications proliferate and the number of input/output (I/O) devices and offload devices increases, collisions between address space management operations and device DMA operations will likely increase, negatively impacting system performance.

DETAILED DESCRIPTION

A filesystem that wants to mutate an address space relative to incoming data transfers without suffering unbounded delays needs to be able to 'pause', 'remap', and 'release' in-process DMA-operations. Additionally, the 'pause-remap-release' capability needs to be a globally available platform attribute not limited to a subset of potential DMA initiators with their own device translation lookaside buffers (TLBs) for this purpose. Embodiments of the present invention provide for this 'pause-remap-release' capability in computing platforms having a persistent memory (PM). Embodiments of the present invention include a mechanism to handle expansion bus bridges, such as Peripheral Component Interconnect Express (PCIe) bridges, to track and throttle traffic to and from the PM based on initiator identifier (ID), and processes to coordinate traffic throttling relative to I/O Memory Management Unit (IOMMU) remap operations.

Embodiments include coordination of a driver implemented in software performing an address space mutation operation (e.g., dynamic remapping of DMA operations to PM) while coordinating with the hardware components of the computing platform to handle in-process hardware-endpoint-initiated data transfers that reference the original state of the address space. Embodiments achieve the dynamic remapping without requiring new "add-in" hardware devices to the computing platform.

Figure 1:
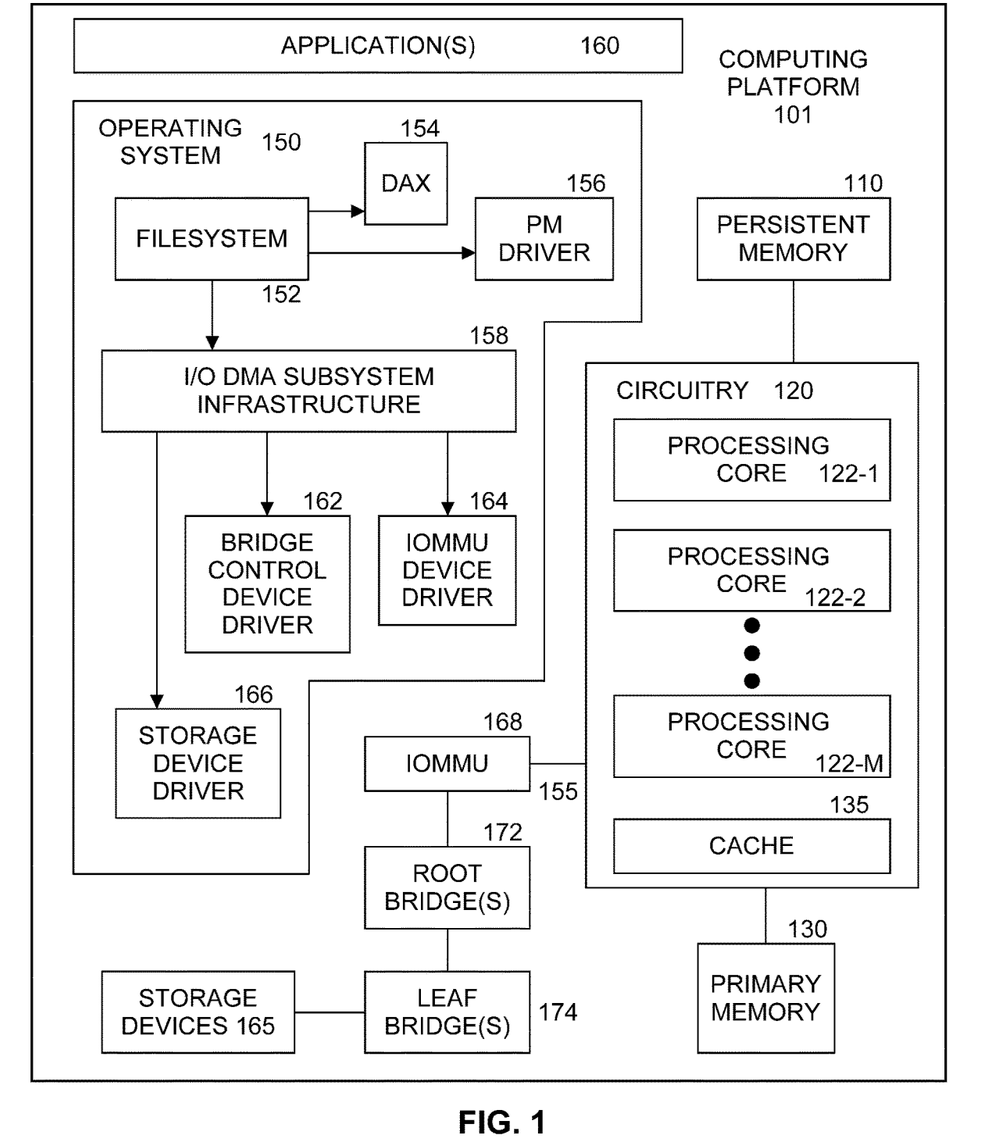
FIG. 1 illustrates an example first computing platform.

FIG. 1 illustrates an example computing platform 101. Computing platform 101 includes circuitry 120, primary memory 130, operating system (OS) 150, at least one application 160, and one or more storage devices 165. Storage devices 165 may be one or more of hard disk drives (HDDs) and/or solid-state drives (SSDs). In an embodiment, storage devices 165 may be non-volatile memories (NVMs). In one embodiment, OS 150 is Linux™. In another embodiment, OS 150 is Windows® Server. In one embodiment, some components of computing platform 101 communicate over a peripheral component interface express (PCIe) bus 155 conforming to version 3.0 or other versions of the PCIe standard published by the PCI Special Interest Group (PCI-SIG). In some examples, OS 150 and application(s) 160 are implemented, at least in part, via cooperation between one or more memory devices included in primary memory 130 (e.g., volatile or non-volatile memory devices), storage devices 165, and elements of circuitry 120 such as processing cores 122-1 to 122-m, where "m" is any positive whole integer greater than 2. In an embodiment, OS 150 and application 160 are executed by one or more processing cores 122-1 to 122-m.

Circuitry 120 having processing cores 122-1 to 122-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Computing platform 101 includes at least one persistent memory (PM) 110. PM 110 may include one or more chips or dies having non-volatile types of memory, including, but not limited to, NAND flash memory, NOR flash memory, 3-D cross-point memory (3D XPoint™) ferroelectric memory, silicon oxide nitride silicon oxide (SONOS) memory, ferroelectric polymer memory, ferroelectric random access memory (FeTRAM), ovonic memory, nanowire, electrically erasable programmable read only memory (EE- PROM), phase change memory, memristors or spin transfer torque memory (STT-MRAM).

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

In at least one embodiment, computing platform 101 includes components to access data storage over bus 155. Computing platform 101 includes I/O memory management unit (IOMMU) 168. IOMMU 168 is a memory management unit (MMU) that connects a DMA-capable I/O bus to the primary memory. Like a traditional MMU, which translates processor-visible virtual addresses to physical addresses, the IOMMU maps device-visible virtual addresses (also called device addresses or I/O addresses in this context) to physical addresses. In an embodiment, IOMMU 168 also provides memory protection from faulty or malicious devices. IOMMU 168 interfaces with one or more root bridges 172. A bridge is a hardware connection between two different buses. In an embodiment, root bridge(s) 172 is a PCI-to-PCI transparent bridge used for bus expansion. Root bridge(s) 172 couple with one or more leaf bridges 174 in a defined topology. In an embodiment, there may be multiple levels of leaf bridges. In an embodiment, at least one level of leaf bridges is provided by a third-party developer as an "add-in" device, not by a manufacturer of computing platform 101. In an embodiment, IOMMU 168, root bridge(s) 172, and leaf bridge(s) 174 communicate over PCIe to access storage devices 165.

In embodiments, bridges in computing platform 101 are modified to include a transparent pause capability. To unaware devices the pause capability looks like typical control flow coordination to arbitrate a congested bus. PCIe bridges implement a flow control mechanism that can consider an initiator provided traffic class identifier when making bandwidth arbitration decisions. The traffic class identifier is a 3-bit identifier. In an embodiment, PCIe bridges are modified to consider the initiator ID in addition to the other existing traffic classes. In an embodiment, initiator identification is incorporated into flow control decisions. PCI-Express implements a capability to reserve bus bandwidth for traffic at a given priority as identified by a traffic class. A given bridge when it has multiple packets in its buffer to send can let the higher priority traffic pass the lower priority. Embodiments modify the classification and prioritization mechanism to also include a programmable initiator ID. During a pause, the bridge refuses to let traffic originating from initiator ID through, but allows other traffic through. Although PCI-Express is discussed herein, embodiments are not limited to PCI-Express and are generally applicable to any bus protocol that has programmable congestion control. When a pause is submitted, the bridge throttles traffic originating from a given initiator ID.

Operating System (OS) 150 includes filesystem 152 to manage files. A filesystem typically expects to submit only "read" and "write" commands to lower level software and wait for the commands to complete. The enhanced filesystem 152 of embodiments of the present invention also submits "remap" commands to lower level software. The typical flow to delete allocated capacity out of a file is to wait for any DMA to complete and then modify the file. In an embodiment, filesystem 152 remaps the DMA to a temporary memory area in primary memory. This allocation serves as a place for the DMA to land until the DMA completes. This allows the deletion to complete unhindered. Filesystem 152 also has the capability to share and relocate data within and between files. Filesystem 152 with the remap enhancements of embodiments of the present invention can perform those operations without awaiting DMA completion.

OS includes PM driver 156 to manage access to PM 110. OS 150 also includes DAX 154 to provide a capability for application(s) 160 to directly access PM 110 without going through any OS buffer caches (not shown). DAX 154 allows filesystem 152 with files stored on PM 110 to bypass PM driver 156 and instead provide direct memory mappings to physical PM pages. The lack of indirection through a traditional OS page/buffer cache allows zero overhead access, but the lack of overhead also leads to the loss of software remapping capabilities. Typically, a filesystem can perform a remap when a page/buffer cache is present by associating a new buffer with an existing file offset. With DAX operations to PM 110 there is a 1:1 file offset to memory buffer relationship. What could previously be done with OS software and extra copies of data now causes delays and extra coordination with DMA operations. Instead, in embodiments filesystem 152 requests IOMMU 168 and modified bridge devices 172, 174 to coordinate the remapping.

OS 160 includes I/O DMA subsystem infrastructure 158 to mediate interactions between filesystem 152, IOMMU device driver 164, bridge control device driver 162, and storage device driver 166. In an embodiment, I/O DMA subsystem infrastructure 158 advertises availability of a remap command to filesystem 152. IOMMU device driver 164 provides an interface for OS 150 to communicate with IOMMU 168. Storage device driver 166 provides an interface for OS 150 to communicate with storage devices 165. Bridge control device driver 162 discovers and manages a pause capability available in root bridge(s) 172 and leaf bridge(s) 174. In an embodiment, all DMA initiators in computing platform 101 (such as storage devices 165) have at least one bridge in a path to PM 110 with a pause capability.

In an embodiment, one or more of DAX 154, PM driver 156, I/O DMA subsystem infrastructure 158, bridge control device driver 162, IOMMU device driver 164, and/or storage device driver 166 may be combined into one or more software components within OS 150.

Figure 2:
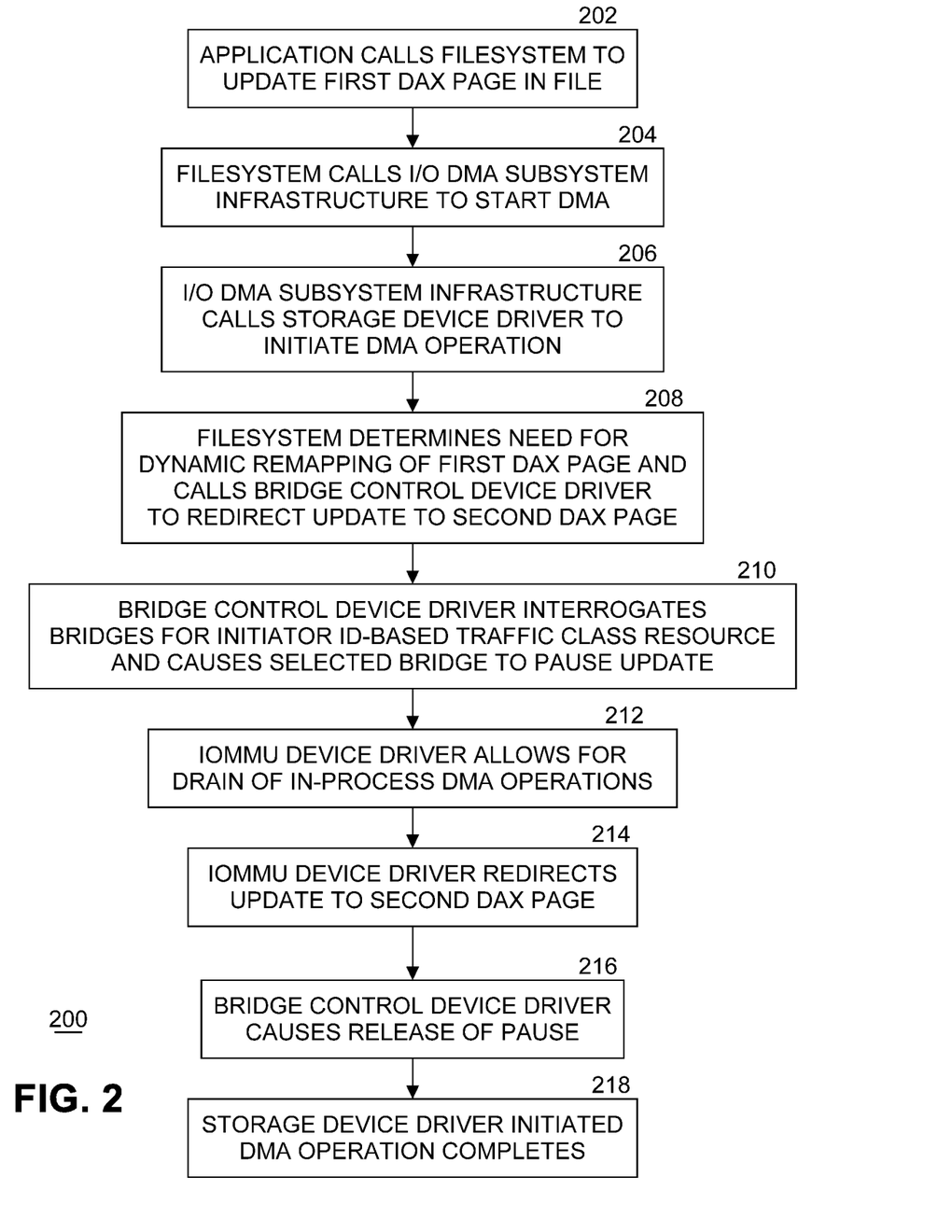
FIG. 2 illustrates an example flow diagram of dynamically remapping in-process data transfers.

FIG. 2 illustrates an example flow diagram of dynamically remapping in-process data transfers. In this example, filesystem 152 is looking to replace the physical DAX page in PM 110 at a given file offset. Note that the difference between a DAX page mapping and a typical filesystem page mapping is the property that there is no indirection between DAX page mapping and the physical storage of file contents. In one embodiment, computing platform 101 includes a PCIe bus topology where one or more bridges in the path between the root port and the initiator has a new 'pause' capability. Finally, filesystem 152 assumes that any possible DMA initiator in the computing platform has at least one 'pause' capable bridge in the path to PM 110.

At block 202, assume a scenario where application(s) 160 calls filesystem 152 in OS 150 to update a first DAX page in a file stored in PM 110 by direct access using DAX 154 instead of PM driver 156, and the data to update the file is stored in one of storage devices 165. The update operation involves a read request to get the data from one of storage devices 165 and transfer the requested data to PM 110. Submitting the read request includes identifying a physical address of a first DAX page and a file offset for physical memory offset translation. At block 204, filesystem 152 calls I/O DMA subsystem infrastructure 158 to start the DMA. At block 206, I/O DMA subsystem infrastructure 158 calls storage device driver 166 to initiate the DMA operation. Storage device driver 166 establishes an I/O virtual address for the transaction. After translation storage device driver 166 submits the I/O virtual address to the end-point's DMA engine. In an embodiment, an end-point refers to PCI-Express terminology for a downstream device that wants to send I/O upstream to a root port.

At block 208, filesystem 152 determines the need for dynamic (e.g., live) remapping of the first DAX page of PM 110 (e.g., replace the first DAX page with another, second DAX page) and calls bridge control device driver 162 to redirect the update to the second DAX page of PM 110. For example, a filesystem may implement a facility to share storage capacity between files that are identical until such time that one of them is written and the copies need to diverge. DMA that could have been reading from a shared location may need to move to a new copy of the page because the old page wants to be written by another process. The filesystem detects the collision between existing reader and new writer, submits the remap for the existing reader, and then lets the new write proceed. At block 210, bridge control device driver 162 interrogates bridges in the data path to the storage device 165 for a virtual/initiator ID-based traffic class resource and causes a selected one or more bridges to pause the update. Typically, in PCIe communications the flow control of a traffic class is limited to a 3-bit identifier. The modified bridge in this instance (e.g., one or more of root bridge(s) 172 and/or one or more of leaf bridge(s) 174) supports an extra programmable traffic class that considers the initiator ID.

Given that a bridge needs to have static resources assigned for each traffic class it may be the case that a bridge can only support remapping one initiator ID at a time. In the case of a lack of resources, the live remap request would fail and filesystem 152 would know to fallback to an unoptimized behavior of waiting for DMA traffic to quiesce. Otherwise, if the initiator ID-based traffic class is established, the bridge can cease providing credits and throttle the initiator (e.g., storage device 165).

At block 212, IOMMU device driver 164 allows for a drain of in-process DMA operations. Once the "pause" has been established, any in-process data transfer cycles from storage device 165 that were not paused need to be drained out of the bus topology (e.g., the root bridge(s) and leaf bridge(s)). In an embodiment, this is implemented as a read operation to the deepest bridge in the topology that is holding a pause for that initiator (e.g., storage device 165). If IOMMU 168 is augmented with hardware dirty page tracking, this information can be used to determine which pages need to be copied or can retain their original contents.

An IOMMU establishes an I/O virtual address space for a range of physical pages. That mapping from I/O-virtual address to System-Physical Address is maintained in memory data structures maintained by the IOMMU hardware and IOMMU device driver. Hardware dirty page tracking, if available, allows the hardware to mark individual pages as dirty (written) as DMA arrives from storage device 165. With that capability, if the inbound DMA write needs to be retargeted, the driver can interrogate the dirty state of each page and only copy the ones that DMA actually wrote. This is an optimization to reduce copying if, for example, a mapping is established for 1 Gigabyte of memory, but the initiator only writes 4 Kilobytes before the pause sequence interrupts the transfer.

At block 214, after the pause and drain are completed, it is safe for IOMMU device driver 164 to redirect IOMMU mapping to a second DAX page, and for the contents of the first DAX page to be copied to the second DAX page. At block 216, once the second DAX page is ready for new data, bridge control device driver 216 causes the pause to be released and inbound DMA continues to flow. At block 218, the storage device driver-initiated DMA operation completes.

Figure 3:
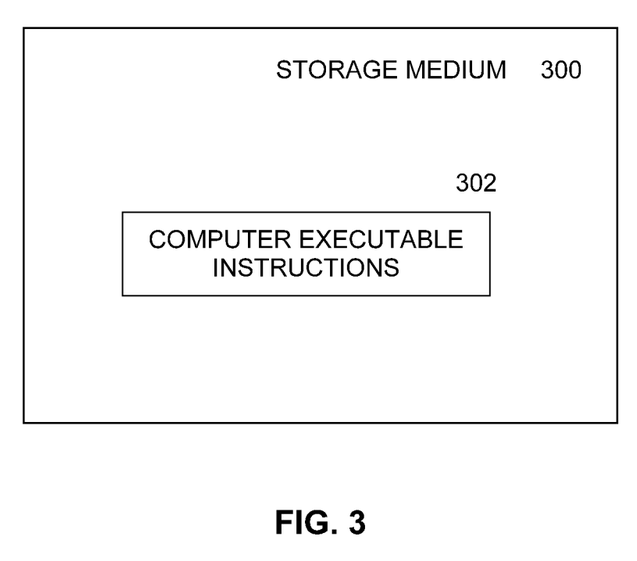
FIG. 3 illustrates an example of a storage medium.

FIG. 3 illustrates an example of a storage medium 300. Storage medium 300 may comprise an article of manufacture. In some examples, storage medium 300 may include any non-transitory computer readable medium or machine readable medium, such as an optical, magnetic or semiconductor storage. Storage medium 300 may store various types of computer executable instructions, such as instructions 302 to implement logic flows and pseudo code described herein. In embodiments, instructions 302 include OS 150 and/or application(s) 160, and include blocks shown in FIG. 2. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 4:
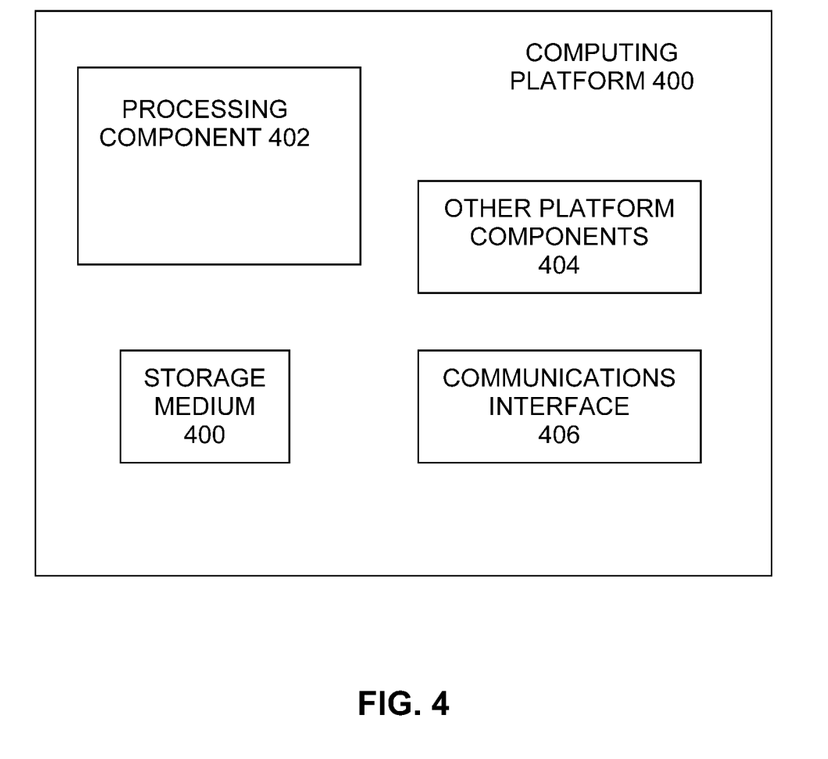
FIG. 4 illustrates an example second computing platform.

FIG. 4 illustrates an example computing platform 400. In some examples, as shown in FIG. 4, computing platform 400 may include a processing component 402, other platform components 404 and/or a communications interface 406.

According to some examples, processing component 402 may execute processing operations or logic for instructions stored on storage medium 300. Processing component 402 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 404 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 406 may include logic and/or features to support a communication interface. For these examples, communications interface 406 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 400, including logic represented by the instructions stored on storage medium 300 may be implemented using any combination of discrete circuitry, ASICs, logic gates and/or single chip architectures. Further, the features of computing platform 400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 400 shown in the block diagram of FIG. 4 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining whether to dynamically remap an in-process direct access (DAX) update of a first page of a three-dimensional cross-point memory to a second page of the three-dimensional cross-point memory, wherein in a DAX update an application directly accesses a page of the three-dimensional cross-point memory without using a buffer cache of an operating system; and
   when a dynamic remap is determined,
      interrogating one or more bridges for a traffic class resource and selecting one of the one or more bridges based at least in part on the traffic class resource;
      causing a pause of the in-process DAX update to the first page of the three-dimensional cross-point memory by the selected bridge,
      draining of in-process direct memory access (DMA) operations,
      redirecting the in-process DAX update to the second page of the three-dimensional cross-point memory,
      releasing the pause of the in-process DAX update to the first page of the three-dimensional cross-point memory by the selected bridge, and
      completing DMA operations for the DAX update of the second page of the three-dimensional cross-point memory.

2. The method of claim 1, comprising receiving a request to DAX update the first page of the three-dimensional cross-point memory from the application, and starting the DMA operations to DAX update the first page of the three-dimensional cross-point memory with data read from a storage device accessible over the selected bridge.

3. The method of claim 1, wherein redirecting the DAX update to the second page of the three-dimensional cross-point memory comprises copying data from the first page of the three-dimensional cross-point memory to the second page of the three-dimensional cross-point memory, and starting DMA operations to DAX update the second page of the three-dimensional cross-point memory with data read from a storage device accessible over the selected bridge.

4. The method of claim 1, wherein the one or more bridges comprises a peripheral component interconnect express (PCIe) bridge.

5. The method of claim 1, wherein the one or more bridges comprises a root bridge coupled to one or more leaf bridges.

6. At least one non-transitory machine-readable storage medium comprising a plurality of instructions that in response to being executed by a processor cause the processor to:
   determine whether to dynamically remap an in-process direct access (DAX) update of a first page of a three-dimensional cross-point memory to a second page of the three-dimensional cross-point memory, wherein in a DAX update an application directly accesses a page of the three-dimensional cross-point memory without using a buffer cache of an operating system; and
   when a dynamic remap is determined,
      interrogate one or more bridges for a traffic class resource and select one of the one or more bridges based at least in part on the traffic class resource;
      cause a pause of the in-process DAX update to the first page of the three-dimensional cross-point memory by the selected bridge,
      drain in-process direct memory access (DMA) operations,
      redirect the in-process DAX update to the second page of the three-dimensional cross-point memory,
      release the pause of the in-process DAX update to the first page of the three-dimensional cross-point memory by the selected bridge, and
      complete DMA operations for the DAX update of the second page of the three-dimensional cross-point memory.

7. The at least one non-transitory machine-readable storage medium of claim 6, comprising instructions to receive a request to DAX update the first page of the persistent three-dimensional cross-point memory from the application, and start the DMA operations to DAX update the first page of the three-dimensional cross-point memory with data read from a storage device accessible over the selected bridge.

8. The at least one non-transitory machine-readable storage medium of claim 6, wherein instructions to redirect the DAX update to the second page of the three-dimensional cross-point memory comprise instructions to copy data from the first page of the three-dimensional cross-point memory to the second page of the three-dimensional cross-point memory, and start DMA operations to DAX update the second page of the three-dimensional cross-point memory with data read from a storage device accessible over the selected bridge.

9. A system comprising:
a three-dimensional cross-point memory having first and second pages accessible by direct access (DAX), wherein in a DAX update an application directly accesses a page of the three-dimensional cross-point memory without using a buffer cache of an operating system;
one or more bridges; and
an operating system to determine whether to dynamically remap an in-process direct access (DAX) update of a first page of a three-dimensional cross-point memory to a second page of the three-dimensional cross-point memory; and
when a dynamic remap is determined,
interrogate one or more bridges for a traffic class resource and select one of the one or more bridges based at least in part on the traffic class resource;
cause a pause of the in-process DAX update to the first page of the three-dimensional cross-point memory by the selected bridge,
drain in-process direct memory access (DMA) operations,
redirect the in-process DAX update to the second page of the three-dimensional cross-point memory,
release the pause of the in-process DAX update to the first page of the three-dimensional cross-point memory by the selected bridge, and
complete DMA operations for the DAX update of the second page of the three-dimensional cross-point memory.

10. The system of claim 9, comprising the operating system to receive a request to DAX update the first page of the three-dimensional cross-point memory from the application, and start the DMA operations to DAX update the first page of the three-dimensional cross-point memory with data read from a storage device accessible over the selected bridge.

11. The system of claim 9, wherein the operating system to redirect the update to the second page of the three-dimensional cross-point memory comprises the operating system to copy data from the first page of the three-dimensional cross-point memory to the second page of the three-dimensional cross-point memory, and start DMA operations to DAX update the second page of the three-dimensional cross-point memory with data read from a storage device accessible over the selected bridge.

12. The system of claim 9, wherein the one or more bridges comprises a peripheral component interconnect express (PCIe) bridge.

13. The system of claim 9, wherein the one or more bridges comprises a root bridge coupled to one or more leaf bridges.

* * * * *